United States Patent [19]
Fujii et al.

[11] Patent Number: 5,212,823
[45] Date of Patent: May 18, 1993

[54] RADIO COMMUNICATION SYSTEM

[75] Inventors: Yuichi Fujii; Tetsuaki Nakanishi, both of Yokohama, Japan

[73] Assignee: Matsushita Electric Industrial Co., Ltd., Osaka, Japan

[21] Appl. No.: 478,379

[22] Filed: Feb. 12, 1990

[30] Foreign Application Priority Data

Feb. 15, 1989 [JP] Japan ............................. 1-36867

[51] Int. Cl.[5] .............................................. H04B 1/00
[52] U.S. Cl. ................................... 455/54.1; 455/67.3
[58] Field of Search ................... 455/127, 343, 54, 67, 455/226; 340/825.48

[56] References Cited

U.S. PATENT DOCUMENTS

| | | | |
|---|---|---|---|
| 4,613,990 | 9/1986 | Halpern | 455/52 |
| 4,654,867 | 3/1987 | Labedz | 379/56 |
| 4,870,698 | 9/1989 | Katsuyama | 455/127 |
| 5,003,619 | 3/1991 | Morris | 455/127 |

OTHER PUBLICATIONS

AMS Preliminary; Cellular Mobile Telephone Equipment Specification; Apr. 1983.

*Primary Examiner*—Reinhard J. Eisenzopf
*Assistant Examiner*—Christine K. Belzer
*Attorney, Agent, or Firm*—Lowe, Price, LeBlanc & Becker

[57] ABSTRACT

In a radio communication system, a base station transmits a signal including a component which designates a power level. A mobile station receives the signal from the base station. In the mobile station, an output power of the mobile station is set to the designated power level, and a field level of the received signal transmitted from the base station is detected. A determination is made as to whether or not the detected field level of the received signal is equal to or higher than a predetermined field level. The output power of the mobile station is decreased from the designated power level by a predetermined value when the detected field level of the received signal is equal to or higher than the predetermined field level.

3 Claims, 8 Drawing Sheets

| POWER LEVEL DESIGNATION CODE | NOMINAL ERP (dBW) | | |
|---|---|---|---|
| | CLASS I | CLASS II | CLASS III |
| 0 | 6 | 2 | -2 |
| 1 | 2 | 2 | -2 |
| 2 | -2 | -2 | -2 |
| 3 | -6 | -6 | -6 |
| 4 | -10 | -10 | -10 |
| 5 | -14 | -14 | -14 |
| 6 | -18 | -18 | -18 |
| 7 | -22 | -22 | -22 |

RADIO COMMUNICATION SYSTEM

BACKGROUND OF THE INVENTION

1. Field of the Invention

This invention relates to a radio communication system which can be used as a mobile telephone system and other similar systems. This invention also relates to a mobile radio communication apparatus used in a radio communication system.

2. Description of the Prior Art

In a general mobile telephone system, the output power of a mobile station is controlled to prevent the interference with other mobile stations.

In the United States, there are known cellular mobile telephone equipments which have a design based on the specification of "Advanced Mobile Phone Service" (AMPS). In such a mobile phone system, the output power of a mobile station is controlled in compliance with a command from a base station to prevent the interference with other mobile stations. In addition, the mobile station controls its output power in accordance with the level of a transmission audio signal to save the power. Saving power is referred to as battery saving in the case of a mobile station of the transportable type or the handheld type which uses a battery (a cell) as a power source.

In such an automobile telephone system, the output power of a mobile station is changed among at most eight different levels in compliance with a command from a base station. The maximum output power level of the mobile station is determined by the power class of the mobile station. The eight different levels are predetermined reference levels separated by intervals of 4 dB. The mobile station is given a tolerance of the output power level which agrees with the range of +2 to −4 dB relative to each of the reference levels. When the base station issues special permission, the mobile station is allowed to decrease its output power up to −8 dB below the designated level. In this case, since the mobile station decreases its output power below the tolerance of the output power level, the mobile station suspends the transmission of a speech supervisory signal (a speech monitor signal) to inform the base station that there is no transmit-audio signal and that the output power is decreased. The speech supervisory signal is composed of a tone signal whose frequency resides outside an audio frequency band, and the tone signal is called a supervisory audio tone in the specification of AMPS. While the base station does not receive any speech supervisory signal from the mobile station, the base station mutes an audio signal transmitted from the mobile station to the other party. While the base station receives a speech supervisory signal, the base station unmutes the audio signal.

As will be explained later, in such a prior-art automobile telephone system, the cancellation of the muting of an audio signal in a base station is liable to delay so that a head of speech tends to fail in the transmission from a mobile station to the other party via the base station.

SUMMARY OF THE INVENTION

It is an object of this invention to provide a radio communication system which can reliably transmit a head of speech between mobile stations via a base station.

It is another object of this invention to provide a mobile radio communication apparatus which can carry out battery saving by controlling its output power level without any failure in the transmission of a head of speech.

According to a first aspect of this invention, a radio communication system comprises a base station transmitting a signal including a component which designates a power level; and a mobile station receiving the signal from the base station; wherein the mobile station comprises means for setting an output power of the mobile station to the designated power level, means for detecting a field level of the received signal transmitted from the base station, means for determining whether or not the detected field level of the received signal is equal to or higher than a predetermined field level, and means for decreasing the output power of the mobile station from the designated power level by a predetermined value when the detected field level of the received signal is equal to or higher than the predetermined field level.

According to a second aspect of this invention, a mobile radio communication apparatus for communication with a base station comprises means for transmitting a first signal toward the base station; means for receiving a second signal from the base station, the second signal including a component which designates a desired power level of the first signal transmitted toward the base station; means for setting an output power of the first signal to the designated desired power level; means for detecting a field level of the second signal received from the base station; and means for decreasing the output power of the first signal from the designated desired power level in accordance with the detected field level of the second signal.

BRIEF DESCRIPTION OF THE DRAWINGS

Like and corresponding elements are denoted by the same reference characters throughout the drawings.

DESCRIPTION OF THE PREFERRED EMBODIMENT

Before the detailed description of the invention, a prior-art battery saving technique in a prior-art cellular mobile telephone apparatus will be explained for a better understanding of this invention.

Figure 6:
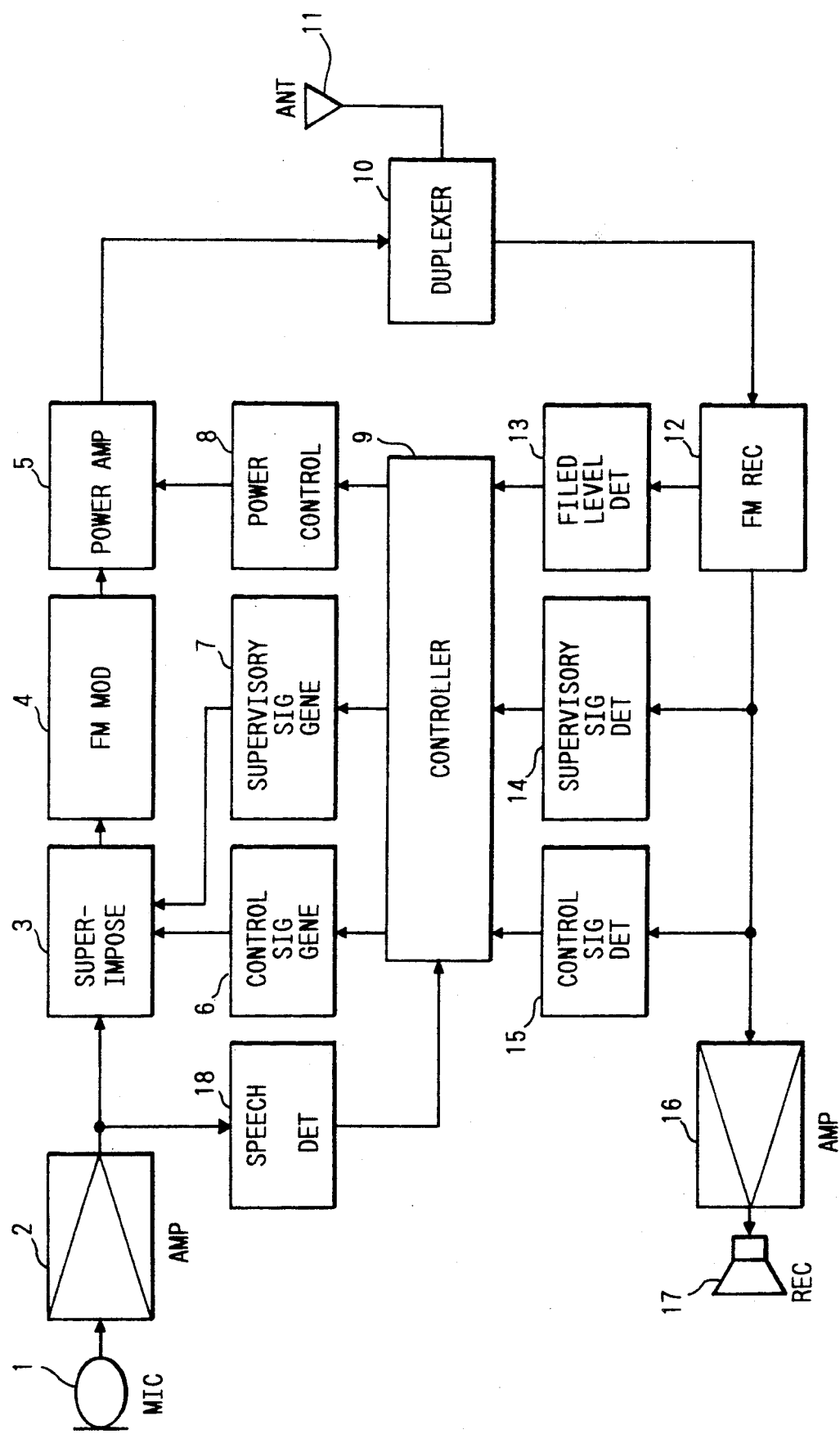
FIG. 6 is a block diagram of a prior-art mobile radio communication apparatus.
Figure 7:
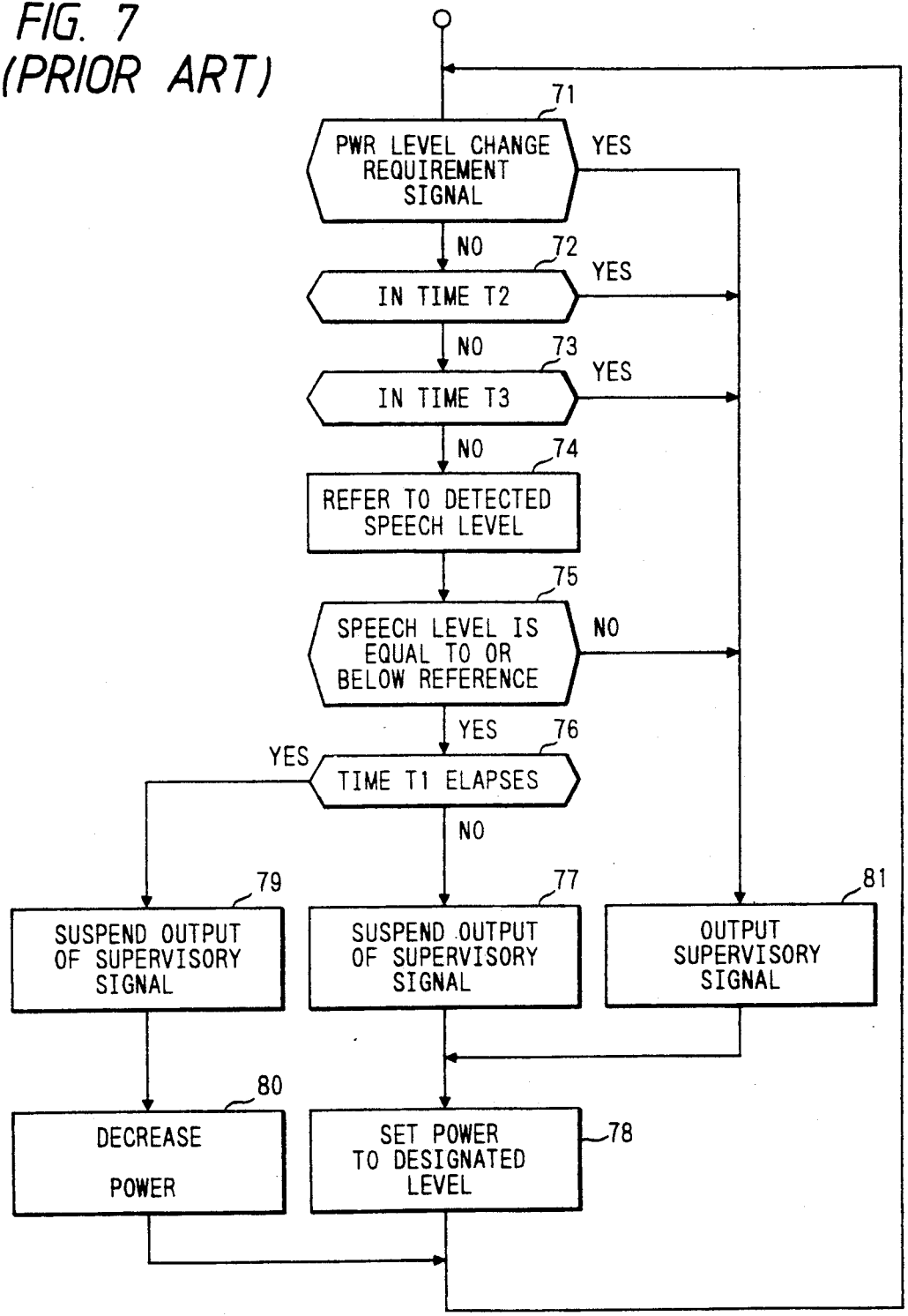
FIG. 7 is a flowchart of the operation of the prior-art apparatus of FIG. 6.
Figure 8:
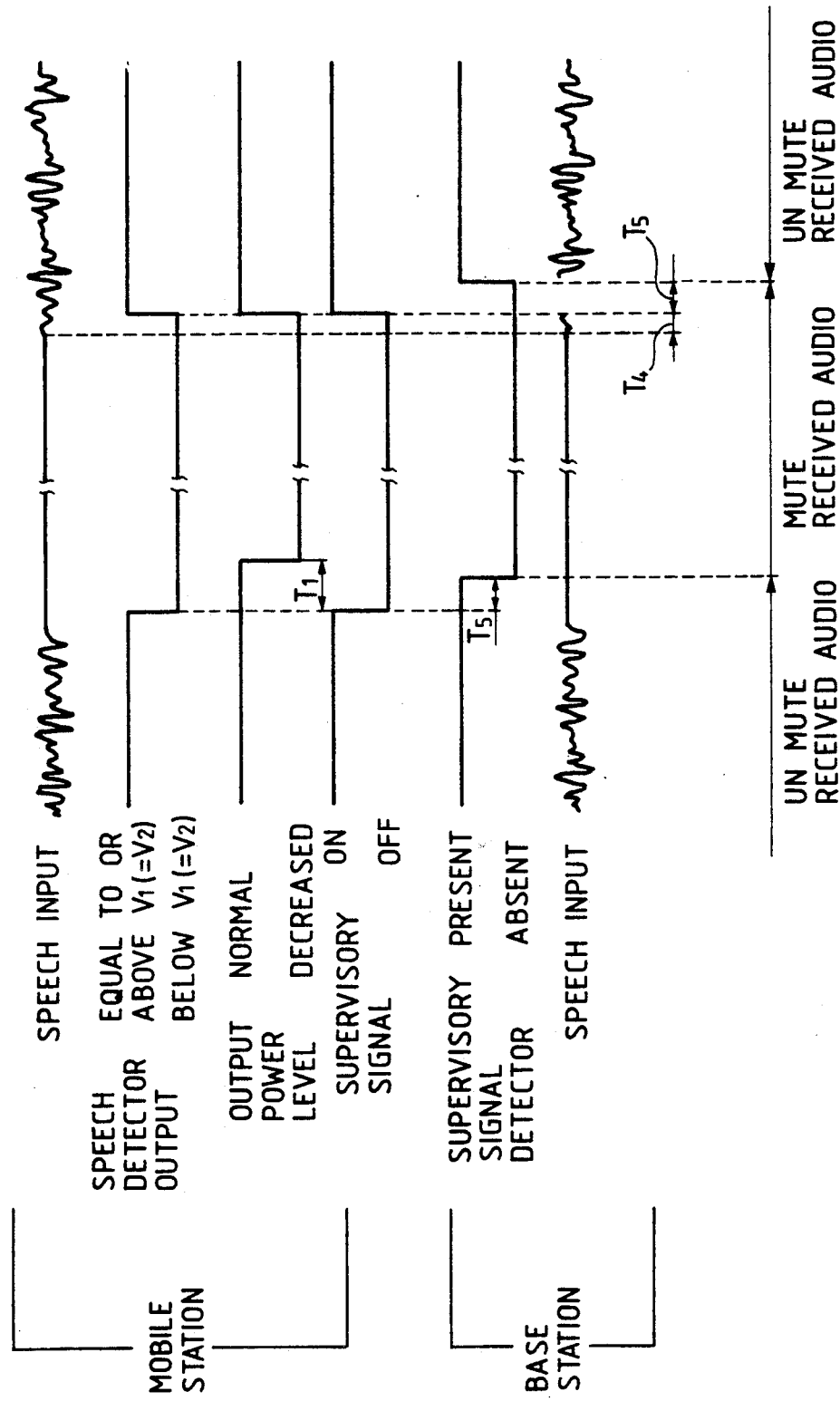
FIG. 8 is a timing diagram of various signals in a prior-art mobile telephone system including a mobile station equipped with the prior-art apparatus of FIG. 6.

FIG. 6 shows a prior-art cellular mobile radio communication apparatus used in a mobile station in a prior-art mobile telephone system. FIG. 7 shows a flowchart of operation of the prior-art radio communication apparatus of FIG. 6. FIG. 8 is a timing chart of various signals in the prior-art cellular mobile telephone system.

In FIG. 7, a time T1 in a step 76 determines the interval from the moment of the suspension of the transmission of a speech supervisory signal to the moment of the decrease of the output power level by a predetermined value. A time T2 in a step 72 determines the interval from the moment of the return of the output power level to the power level designated by a base station to the moment of the re-start of the output power level control based on a transmission speech level. A time T3 in a step 73 determines the interval from the moment of the reception of a power level change requirement signal from a base station to the moment of the re-start of the output power level control based on the transmission speech level.

With reference to FIGS. 6-8, when the mobile station receives a power level change requirement signal from a base station via an antenna 11, a duplexer 10, an FM receiver section 12, and a control signal receiving circuit 15, a controller 9 controls an output power control circuit 8 so that the level of the output power from a transmission power amplifier 5 will be equal to the power level designated by the received power level change requirement signal. This process corresponds to steps 71, 81, and 78 of FIG. 7.

The level of an audio signal or a speech signal inputted via a microphone 1 is detected by a transmission speech detector 18. When the detected audio level is equal to or lower than a predetermined reference level V1 (a step 75 of FIG. 7), the controller 9 controls a speech supervisory signal generator 7 so that the generator 7 will suspends the outputting of a speech supervisory signal (steps 75, 76, 77, and 79 of FIG. 7). In the case where the detected audio level remains equal to or lower than the reference level V1 for a predetermined time T1, the controller 9 controls the output power control circuit 8 so that the level of the output power from the transmission power amplifier 5 will drop by a predetermined level (steps 79 and 80 of FIG. 7).

When the detected level of the audio signal inputted via the microphone 1 exceeds a predetermined reference level V2, the controller 9 controls the speech supervisory signal generator 7 so that the generator 7 will restarts the outputting of the speech supervisory signal (the steps 75 and 81 of FIG. 7). At the same time, the controller 9 controls the output power control circuit 8 so that the level of the output power from the transmission power amplifier 5 will return to the previous level (the step 78 of FIG. 7). The reference level V2 is supposed to be set to the reference level V1 in FIG. 7.

During a predetermined time T2 thereafter, the controller 9 controls the output power control circuit 8 so that the level of the output power will be maintained at that level independent of the level of the transmission audio signal (the steps 72, 81, and 78 of FIG. 7). In addition, in the case where the mobile station receives a power level change requirement signal from the base station, the controller 9 controls the output power control circuit 8 so that the level of the output power will be equal to the power level designated by the received power level change requirement signal, and then the output power level will be held at the designated level independent of the level of the transmission audio signal during a predetermined time T3 (the steps 73, 81, and 78).

The base station monitors a speech supervisory signal. As shown in FIG. 8, when the base station does not receive any speech supervisory signal from the mobile station, the base station mutes an audio signal transmitted from the mobile station to the other party. When the base station receives a speech supervisory signal, the base station cancels the muting of the audio signal.

Since the output power level is lowered when the level of the transmission audio signal is equal to or lower than the reference level V1, the mobile station can save the power, i.e., can realize battery saving.

In FIG. 6, a received field level detector 13 measures the received field levels of respective control channels used in the cellular mobile telephone system. The controller 9 uses the output signal from the received field level detector 13 to select one of the control channels which has the highest received field level.

In the prior-art mobile telephone system of FIGS. 6-8, when the mobile station suspends the output of a speech supervisory signal and the base station detects the absence of the speech supervisory signal, the base station mutes an audio signal transmitted from the mobile station to the other party. When the base station receives a speech supervisory signal again, the base station cancels the muting of the audio signal. As shown in FIG. 8, there is a significant time lag or difference "T4+T5" between the moment of the re-inputting of a speech into the mobile station and the moment of the cancellation of the muting of the transmission audio signal by the base station. This time lag causes a failure in the transmission of a starting part or a head of a re-started speech from the mobile station to the other party via the base station. The character T4 denotes the interval from the moment of the detection of a transmission speech to the moment of the restart of the transmission of the speech supervisory signal in the mobile station. The character T5 denotes the interval from the moment of the restart of the transmission of the speech supervisory signal by the mobile station to the moment of the cancellation of the muting of the audio signal by the base station.

This invention resolves such a problem in the prior-art battery saving technique in the cellular mobile telephone system of FIGS. 6-8. This invention will now be described in detail with reference to drawings.

Figure 1:
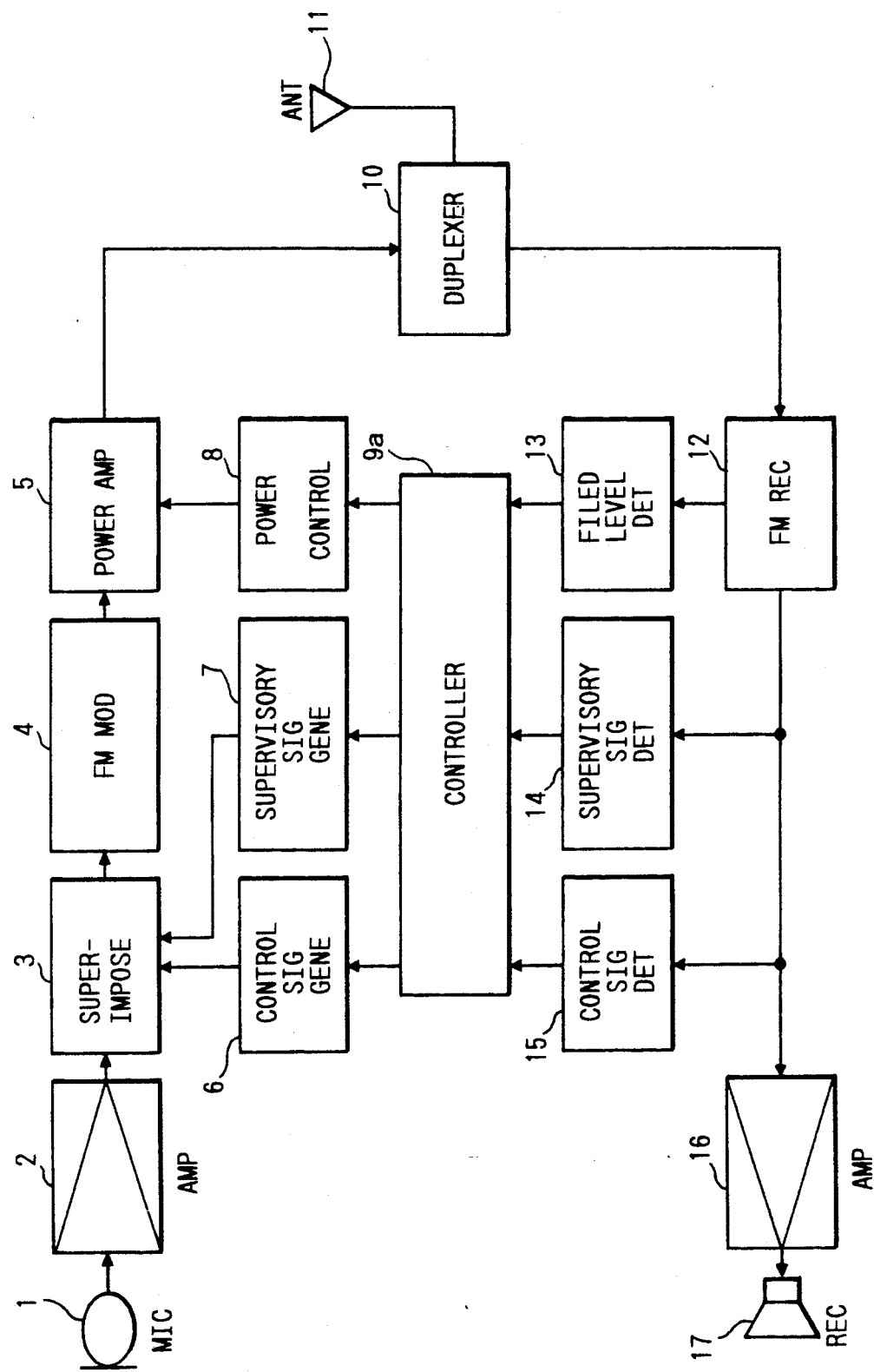
FIG. 1 is a block diagram of a mobile radio communication apparatus in an embodiment of this invention.

FIG. 1 shows a radio communication apparatus used in a mobile station in a radio communication network system according to an embodiment of this invention. With reference to FIG. 1, a speech is converted by a microphone 1 into a corresponding speech or audio signal. The audio signal is fed to a superimposing circuit 3 via an AF amplifier 2. A control signal generator 6 outputs a control signal to the superimposing circuit 3. A speech supervisory signal generator 7 outputs a speech signal to the superimposing circuit 3. The superimposing circuit 3 superimposes the speech signal, the control signal, and the speech supervisory signal into a composite or multiplexed signal. The composite signal is applied to an FM modulator 4. The FM modulator 4 modulates an RF carrier with the composite signal, generating an RF signal carrying the composite signal. The RF output signal from the FM modulator 4 is amplified by an RF power amplifier 5 at a gain which is controlled by an output power control circuit 8. The RF output signal from the RF power amplifier 5 is fed to an antenna 11 via a duplexer 10 and is radiated from the antenna 11 toward a base station.

The control signal generator 6 is controlled by a controller 9a to output a control signal such as an origination signal, a page response signal, or a release signal. The speech supervisory signal generator 7 is controlled by the controller 9a to selectively enable and disable the output of the speech supervisory signal. The output power control circuit 8 is controlled by the controller 9a to adjust the gain of the RF power amplifier 5.

The duplexer 10 operates in a conventional manner. During the transmission mode of operation of the mobile radio communication apparatus, the duplexer 10 connects the antenna 11 with the RF power amplifier 5. During the reception mode of operation of the mobile radio communication apparatus, the duplexer 10 connects the antenna 11 with an FM receiver section 12.

An RF signal transmitted from a base station is induced in the antenna 11. The induced RF signal is fed to the FM receiver section 12 via the duplexer 10. The received RF signal is subjected to FM demodulation by the FM receiver section 12 so that a composite signal containing a speech signal, a control signal, and a speech supervisory signal is recovered. The control signal includes a power level change requirement signal generated by a base station. The recovered composite signal is fed from the FM receiver section 12 to a speech supervisory signal detector 14, a control signal detector 15, and an AF amplifier 16. In addition, the FM receiver section 12 outputs a signal representative of the received signal strength to a received field level detector 13. The received field level detector 13 detects the field level of the received RF signal based on the received signal strength at the FM receiver section 12. The speech supervisory signal detector 14 detects the speech supervisory signal from the composite signal. The control signal detector 15 detects the control signal, e.g., the power level change requirement signal, from the composite signal. Output signals from the devices 13–15 are applied to the controller 9a. The output signal from the received field level detector 13 is repeatedly sampled by and stored into the controller 9a at intervals equal to a predetermined period T6. For example, the predetermined period T6 equals 250 ms. The speech signal is amplified by the AF amplifier 16 and is then fed to a telephone receiver 17. The telephone receiver 17 converts the speech signal into corresponding sound.

In a base station, a speech supervisory signal is composed of a tone signal whose frequency resides outside an audio (speech) frequency band. The base station 20 transmits the speech supervisory signal on a voice channel. When a mobile station receives a speech supervisory signal from the base station, the mobile station transponds the speech supervisory signal to the base station. The base station monitors conditions of the voice-channel radio communication path between the base station and the mobile station by checking the transponded speech supervisory signal. The base station also transmits a power level change requirement signal to a mobile station. The power level change requirement signal designates one of predetermined different levels of the output power from the mobile station. The maximum output power level of the mobile station is determined by the power output class of the mobile station. The predetermined different levels include at most eight reference levels separated by equal intervals of 4 dB. The mobile station adjusts its output power level to around the reference level designated by the power level change requirement signal. The mobile station is allowed to vary its power output level in the range of +2 to −4 dB relative to the designated reference level.

Figures 2, 3:
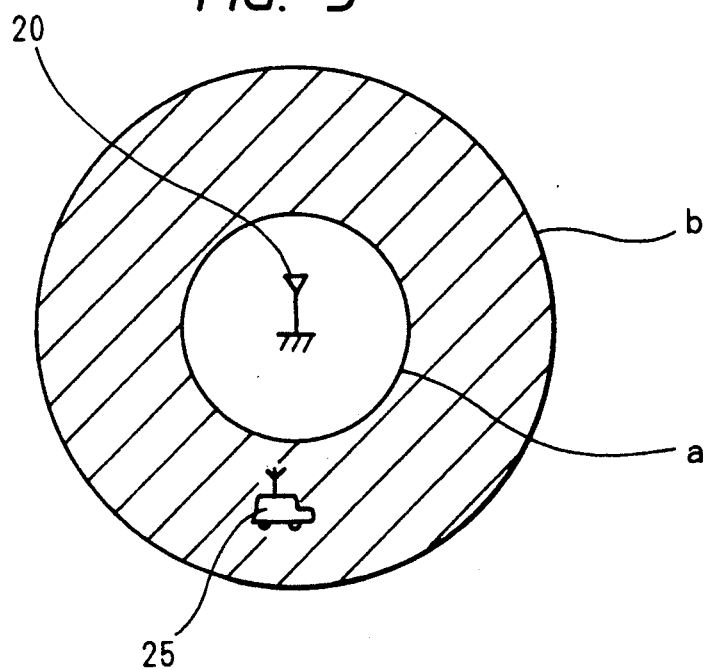
FIG. 2 is a diagram showing the relation among the power output class of a mobile station, reference levels of the output power of the mobile station, and a power level code used in a signal which designates an output power reference level.
FIG. 3 is a diagram of a base station, a mobile station, and an area where the mobile station can decrease its output power from the designated power level based on the received signal level.

FIG. 2 shows the relation among the power output class of a mobile station, reference levels of the output power of the mobile station, and a code in a power level change requirement signal which designates an output power reference level. Mobile stations are separated into three power output classes I, II, and III. Mobile stations of the class I have eight reference power output levels from −22 dBW to +6 dBW. Mobile stations of the class II have seven reference power output levels from −22 dBW to +2 dBW. Mobile stations of the class III have six reference power output levels from −22 dBW to −2 dBW. The reference power output levels are separated by equal intervals of 4 dB. As the power level designation code decreases from "7" to "0", the designated reference power output level increases from the minimum to the maximum.

FIG. 3 shows a radio area where the mobile station 25 can carry out the battery saving by this invention. When a mobile station 25 resides within an inner circle "a" around the base station 20 and the mobile station 25 is exposed to a very strong field from the base station 20, the base station 20 designates the second highest or lower reference levels of the output power of the mobile station 25. When the mobile station 25 resides outside the inner circle "a" and the field level of the signal received by the base station from the mobile station is not so strong, the base station 20 designates the highest reference level of the output power of the mobile station 25.

As will be described later, the battery saving of this invention is allowed in an area around a base station which corresponds to the region outside the inner circle "a" but inside the outer circle "b".

Figure 4:
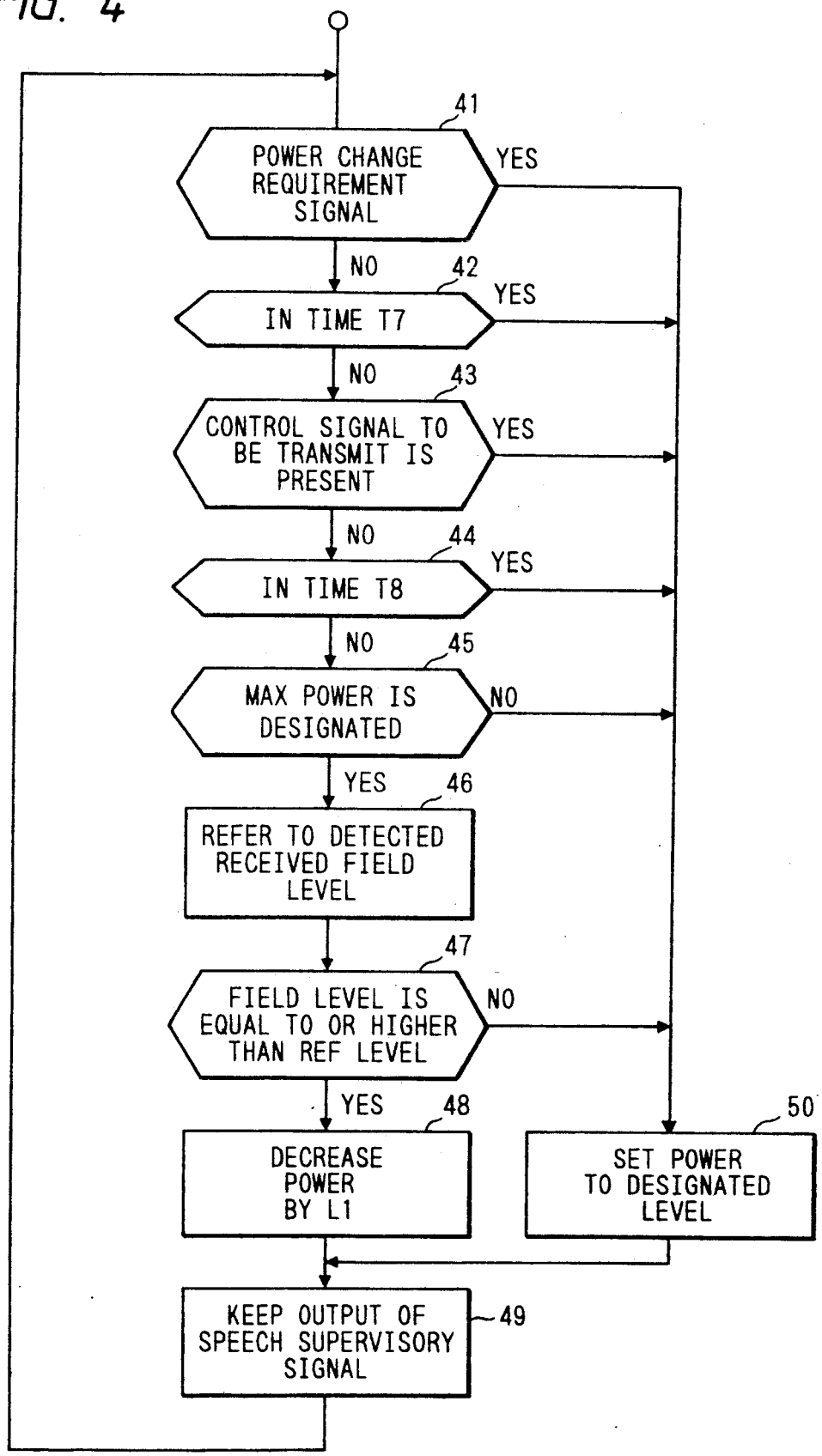
FIG. 4 is a flowchart of a program operating the controller of FIG. 1.

The controller 9a includes a microcomputer which operates in accordance with a program stored in a ROM. FIG. 4 is a flowchart of this program.

As shown in FIG. 4, a first step 41 of the program determines whether or not a power level change requirement signal is just received from a base station by referring to the output signal from the control signal detector 15. When the power level change requirement signal is received, the program jumps to a step 50. The step 50 controls the output power control circuit 8 so that the level of the output power from the power amplifier 5 will be equal to the reference level designated by the power level change requirement signal. After the step 50, the program advances to a step 49 which controls the speech supervisory signal generator 7 so that the speech supervisory signal generator 7 holds the outputting of a speech supervisory signal to the superimposing circuit 3. After the step 49, the program returns to the step 41. When the power level change requirement signal is not received in the step 41, the program advances to a step 42.

The step 42 determines whether or not a predetermined time T7 elapses from a given moment described hereinafter. The predetermined time T7 gives the interval from the moment of the reception of the power level change requirement signal to the moment of the re-start of power level reduction control based on a received field level. In the case where a mobile station receives an "initial voice channel designation" signal, which designates a voice channel to be used by the mobile station, on a control channel, and also in the case where a mobile station receives a "handoff" signal, which requires a change to a new voice channel, on the voice channel, these signals have information designating an output power level which should be set in the voice channel used hereafter. Therefore, in these cases, after the voice channel starts to be used or after the voice channel is changed, the time T7 is applied during which the control of the output power level with the received field level remains unexecuted.

When the predetermined time T7 does not elapse, the program jumps from the step 42 to the step 50. When the predetermined time T7 elapses, the program advances from the step 42 to a step 43. The step 43 determines whether or not there is a requirement for transmitting a control signal to a base station. For example, the control signal transmitted to the base station is a response message signal responsive to the reception of a control signal from the base station, a control tone signal different from the speech supervisory signal, a DTMF signal for transmitting dial information during conversation, and so on. When a requirement for transmitting a control signal to a base station is present, the program jumps from the step 43 to the step 50. When a requirement for transmitting a control signal to a base station is absent, the program advances from the step 43 to a step 44.

The step 44 determines whether or not a predetermined time T8 elapses from a given moment described hereinafter. The predetermined time T8 gives the interval from the moment of setting the output power to the designated level for the transmission of a control signal toward a base station to the moment of re-start of the power level reduction control based on the received field level. The predetermined time T8 may be dependent upon the type of the control signal transmitted to the base station. When the predetermined time T8 does not elapse, the program jumps from the step 44 to the step 50. When the predetermined time T8 elapses, the program advances from the step 44 to a step 45.

The step 45 determines whether or not the power output level designated by the base station agrees with the highest or maximum reference level. When the designated power output level disagrees with the maximum reference level, the program jumps to the step 50. When the designated power output level agrees with the maximum reference level, the program advances to a step 46.

The step 46 performs a predetermined judgment on the received field level derived from the output signal of the received field level detector 13 as will be explained hereinafter. Firstly, the step 46 determines whether the output power level is equalized to or decreased below the reference level designated by the base station. In the case where the output power level is equalized to the designated reference level, the step 46 determines whether or not the received field level remains equal to or higher than a predetermined level R1 during a predetermined interval corresponding to a given number N1 multiplied by a predetermined sampling period. The number N1 corresponds to the number of times of the measurement of the received field level. When this condition is satisfied, the received field level is judged to be equal to or higher than the predetermined level. Otherwise, the received field level is judged to be smaller than the predetermined level. In the case where the output power level is decreased below the designated reference level, the step 46 determines whether or not the received field level remains lower than a predetermined level R2 during a predetermined interval corresponding to a given number N2 multiplied by a predetermined sampling period. The number N2 corresponds to the number of times of the measurement of the received field level. When this condition is satisfied, the received field level is judged to be smaller than the predetermined level. Otherwise, the received field level is judged to be not smaller than the predetermined level. The predetermined level R2 may be equal to the predetermined level R1.

A step 47 refers to the result of the judgment by the previous step 46 and thereby derives information related to whether or not the received field level continues to be equal to or higher than the predetermined level R1 or R2. In the case where the received field level continues to be equal to or higher than the predetermined level R1 or R2, the program advances to a step 48. Otherwise, the program advances to the step 50. The step 48 controls the output power control circuit 8 so that the output power level will be decreased by a predetermined level L1. The predetermined level L1 is chosen so that the base station can maintain reliable communication with the mobile station to keep reliable control of the power output level of the mobile station. For example, the predetermined level L1 equals 4 dB or less. After the step 48, the program advances to the step 49.

The steps 46, 47, and 48 enable the following process. In the case where the received field level continues to be equal to or higher than the predetermined level R1 while the output power level is equalized to the designated reference level, the output power level is decreased by the predetermined level L1. The decrease in the output power level results in power saving or battery saving. The steps 46, 47, and 50 enable the following process. In the case where the received field level continues to be lower than the predetermined level R2 while the output power level is decreased below the designated reference level, the output power level is returned to the designated reference level.

As described previously, the step 49 is executed after the step 48. Accordingly, even in the case where the output power level is decreased, the speech supervisory signal keeps transmitted to the base station and thus the base station holds the transmission of the speech signal from the present mobile station to the other mobile station. Therefore, in such a case, the muting of the speech signal is prevented and also a failure in the transmission of a head of subsequent speech is prevented.

In this invention, in the case where the mobile station 25 resides within the outer circle "b" (see FIG. 3) and the mobile station 25 is exposed to a moderate or not so weak field from the base station 20, the output power level of the mobile station 25 is decreased by the step 48 by a value small enough to maintain reliable communication between the mobile station 25 and the base station 20. The decrease in the output power level of the mobile station 25 ensures that other mobile stations, which use the voice channel with the same frequency in another radio area by frequency reuse in the cellular mobile telephone system, do not interfere with the mobile station 25.

In addition, only when the base station 20 designates the maximum reference level of the output power to the mobile station, i.e., only when the mobile station 25 resides outside the inner circle "a" shown in FIG. 3, the mobile station carries out this power level reduction control based on the received field level. When the power level change requirement signal is received from the base station, the output power level is set to the newly designated level by the step 50. Since the steps 42 and 50 function to unexecute lowering the output power by the step 48 for the predetermined time T7 thereafter, the base station can reliably control the output power of the mobile station.

In the case where the mobile station intends to transmit a control signal to the base station, the steps 43 and 50 function to set the output power level of the mobile station to the reference level designated by the base station and then the transmission of the control signal is executed. Since the steps 44 and 50 function to unexecute lowering the output power by the step 48 for the predetermined time T8 thereafter, the base station can reliably receive the control signal from the mobile station.

In the case where the mobile station 25 resides outside the outer circle "b" (see FIG. 3) and the mobile station 25 is exposed to a weak field from the base station 20, the steps 45, 46, 47, and 50 function to maintain the output power level of the mobile station 25 at its maximum reference level so that this power level control based on the received field level does not affect the radio coverage area around the base station 20 in width.

The interval T6 between the moments of the periodical measurement of the received field level and the number N1 of times of the measurement of the received field level are chosen so that the judgment by the steps 46 and 47 can remain accurate independent of fading. For example, in the case where the interval T6 is set to 0.25 seconds and the number N1 is set to 5, it is possible to prevent an adverse influence by fading with a low pitch such as a 1-Hz pitch.

The number N2 of times of the measurement of the received field level is used in the return of the output power level to the designated level. This number N2 is chosen in view of the case where fading which can not be compensated by appropriately setting of the interval T6 and the number N1 causes the received field level to be higher in average than the reference level and thus the output power level is erroneously decreased. The number N2 is preferably set to 1 in order to shorten the duration for which the output power level remains erroneously decreased.

In order to prevent an adverse influence by fading with a high pitch, the measurement of the instantaneous levels of the received field may be replaced by the calculation of an average of the levels of the received field which are detected at a period adequately shorter than the predetermined interval T6. Specifically, the measurement of the received field is repeatedly performed a number P of times which equals 3 or more. A predetermined number L of the highest and higher measured values are ignored. The number L equals 1 or more. A predetermined number M of the lowest and lower measured values are ignored. The number M equals 1 or more. The average of the remaining values whose number equals P-L-M is calculated. This process means calculating the average while ignoring fading peaks and bottoms. For example, the measurement of the received field level is repeatedly performed five times at a period of 5 milliseconds, and the highest measured value and the lowest measured value are ignored. The average is calculated from the remaining three intermediate measured values. In this case, it is possible to prevent an adverse influence by fading with a pitch of 50 Hz or higher.

Figure 5:
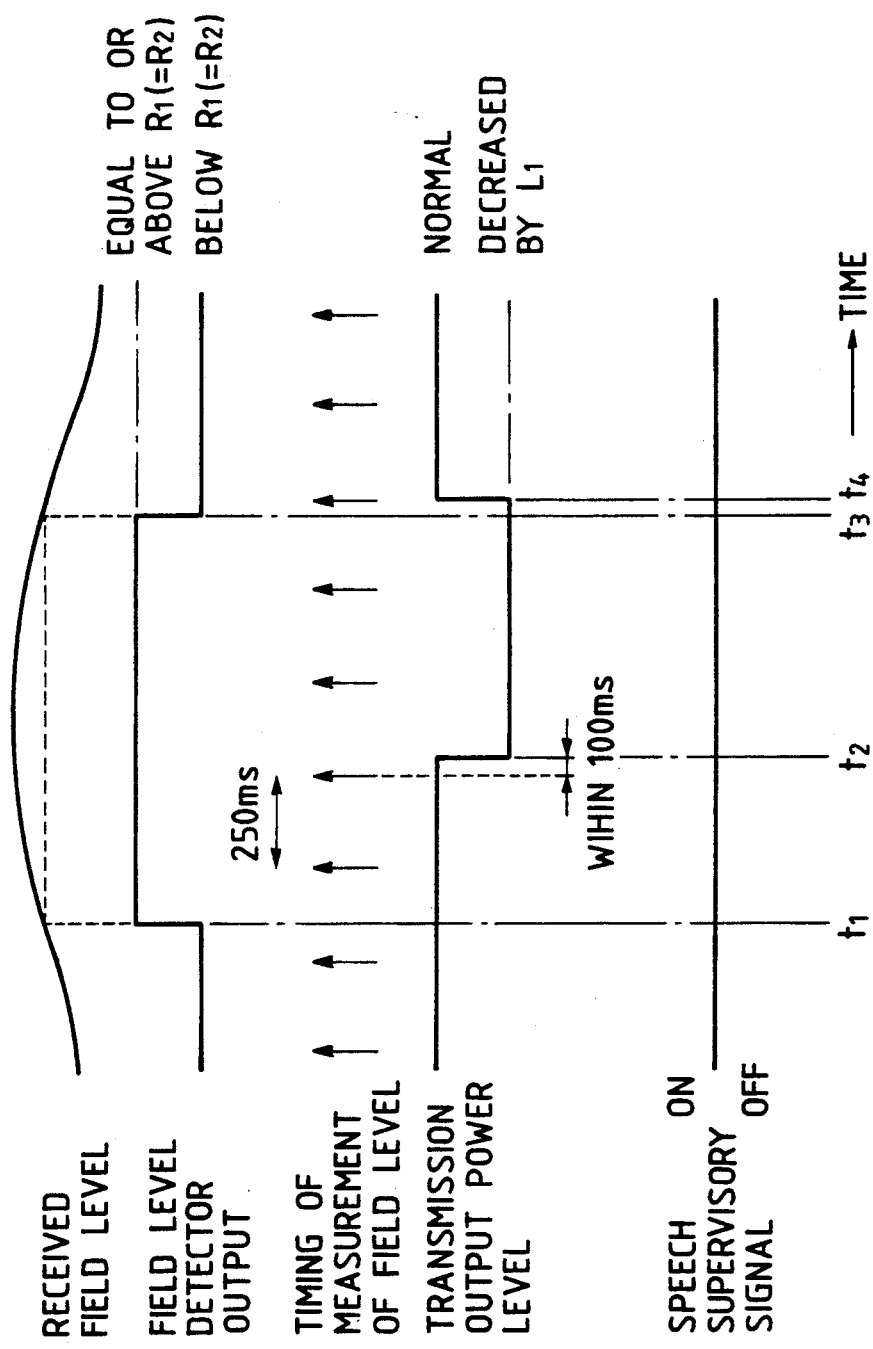
FIG. 5 is a timing diagram of various signals in the mobile radio communication apparatus of FIG. 1.

FIG. 5 shows an example of conditions of various signals which occur in the case where the predetermined interval T6 is set to 0.25 seconds and the numbers N1 and N2 are set to 2 and 1 respectively. In this example, the reference level R2 is equal to the reference level R1. With reference to FIG. 5, the received field level increases above the reference level R1 or R2 at a moment t1. The received field level remains above the reference level R1 or R2 during a period from the moment t1 to a moment t3. At the moment t3, the received field level drops below the reference level R1 or R2. During the period between the moments t1 and t3 where the received field level remains above the reference level R1 or R2, at a moment t2 immediately after the number of times of the measurement of the received field level reaches two, the output power level is lowered. At a moment t4 which immediately follows the moment t3, the output power level is returned to the previous value. A speech supervisory signal remains on or transmitted independent of the control of the output power level.

Figure 9:
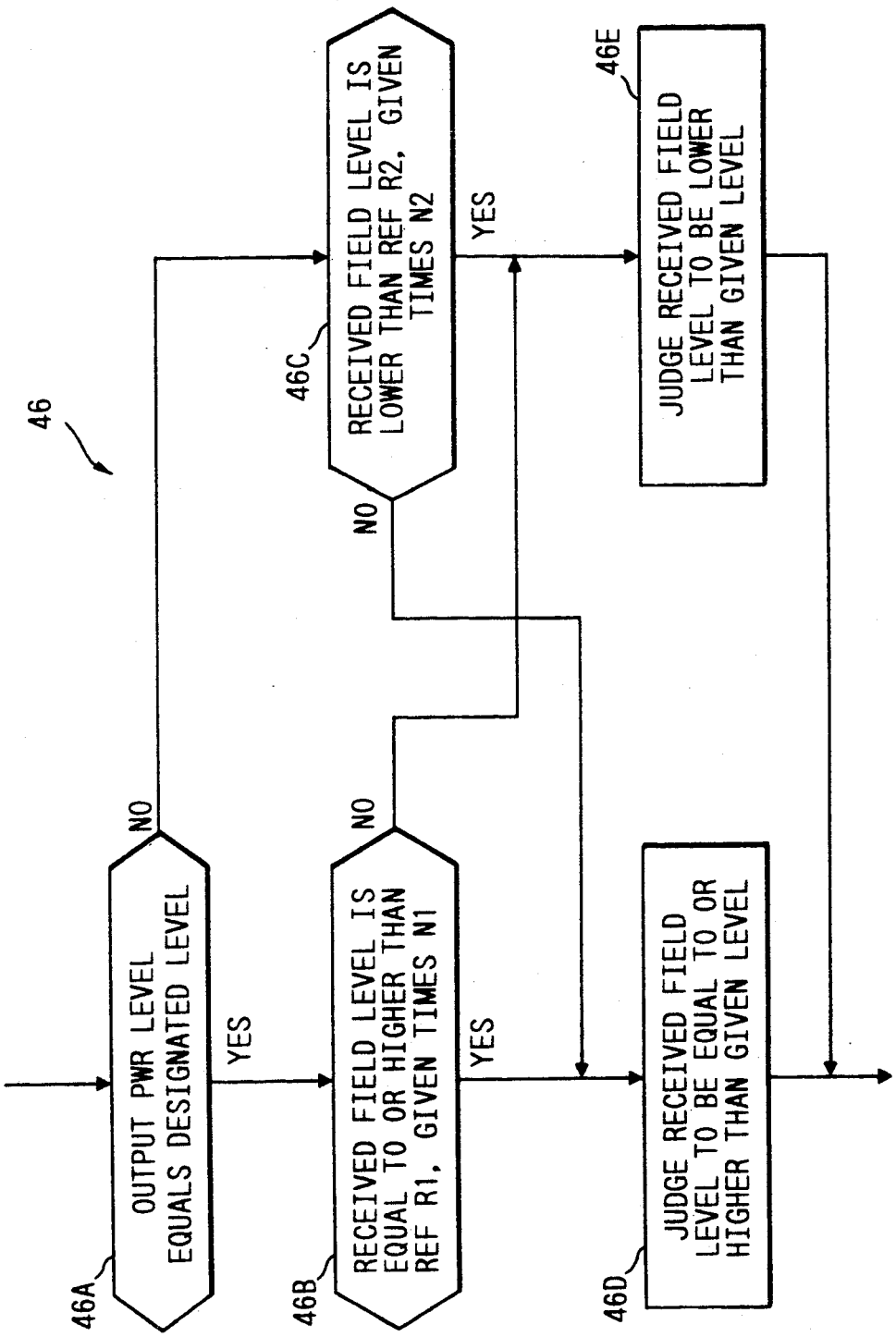
FIG. 9 is a diagram showing the internal design of a step of FIG. 4.

FIG. 9 shows an internal design of the step 46 of the program flowchart of FIG. 4. As shown in FIG. 9, the step 46 includes sub steps 46A-46E. The first sub step 46A determines whether the output power level is equalized to or decreased below the reference level designated by the base station. In the case where the output power level is equalized to the designated reference level, the program advances from the sub step 46A to the sub step 46B. In the case where the output power level is decreased below the designated reference level, the program advances from the sub step 46A to the sub step 46C. The sub step 46B determines whether or not the received field level remains equal to or higher than a predetermined level R1 during a predetermined interval corresponding to a given number N1 multiplied by a predetermined sampling period. The number N1 corresponds to the number of times of the measurement of the received field level. When the received field level remains equal to or higher than the predetermined level R1, the program advances from the sub step 46B to the sub step 46D. When the received field level does not remain equal to or higher than the predetermined level R1, the program advances from the sub step 46B to the sub step 46E. The sub step 46C determines whether or not the received field level remains lower than a predetermined level R2 during a predetermined interval corresponding to a given number N2 multiplied by a predetermined sampling period. The number N2 corresponds to the number of times of the measurement of the received field level. When the received field level remains lower than the predetermined level R2, the program advances from the sub step 46C to the sub step 46E. When the received field level does not remain lower than the predetermined level R2, the program advances from the sub step 46C to the sub step 46D. The sub step 46D sets a flag indicating that the received field level is equal to or higher than a prescribed level. The sub step 46E sets a flag indicating that the received field level is lower than a prescribed level. After the sub steps 46D and 46E, the program advances to the step 47 (see FIG. 4). The step 47 refers to the flags set in the sub steps 46D and 46E and thereby derives information related to whether or not the received field level continues to be equal to or higher than the predetermined level R1 or R2.

What is claimed is:

1. A radio communication system comprising:
   a base station transmitting a signal including a component which designates a power level; and
   a mobile station receiving the signal from the base station;
   wherein the mobile station comprises means for setting an output power of the mobile station to the designated power level, means for detecting a received field level of the signal transmitted from the base station, means for determining whether or not the detected field level of the received signal is equal to or higher than a predetermined field level, and means for decreasing the output power of the mobile station from the designated power level by a predetermined value when the detected field level of the received signal is equal to or higher than the predetermined field level, and
   wherein the base station transmits a speech supervisory signal to the mobile station on a voice channel, the speech supervisory signal includes a tone signal whose frequency resides outside an audio frequency band, and the mobile station transponds the speech supervisory signal even when the output power of the mobile station is decreased by a predetermined value from the designated power level.

2. A radio communication system comprising:
   a base station transmitting a signal including a component which designates a power level; and
   a mobile station receiving the signal from the base station;
   wherein the mobile station comprises means for setting an output power of the mobile station to the designated power level, means for detecting a received field level of the signal transmitted from the base station, means for determining whether or not the detected field level of the received signal is equal to or higher than a predetermined field level, and means for decreasing the output power of the mobile station from the designated power level by a predetermined value when the detected field level of the received signal is equal to or higher than the predetermined field level, and
   wherein the mobile station decreases its output power from the designated power level in accordance with the detected field level only in cases where the designated power level agrees with a maximum output power of the mobile station.

3. A mobile radio communication apparatus for communication with a base station, comprising:
   means for transmitting a first signal toward the base station;
   means for receiving a second signal from the base station, the second signal including a component which designates a desired power level of the first signal transmitted toward the base station;
   means for setting an output power of the first signal to the designated desired power level;
   means for detecting a field level of the second signal received from the base station;
   means for decreasing the output power of the first signal from the designated desired power level in accordance with the detected field level of the second signal; and
   means for detecting that the designated desired power level of the first signal differs from a maximum output power of the first signal; and means for suspending the decreasing of the output power of the first signal when the designated desired power level of the first signal differs from the maximum output power of the first signal.

* * * * *